United States Patent
Sun et al.

(10) Patent No.: US 7,142,513 B2
(45) Date of Patent: Nov. 28, 2006

(54) METHOD AND MULTI-QUEUE PACKET SCHEDULING SYSTEM FOR MANAGING NETWORK PACKET TRAFFIC WITH MINIMUM PERFORMANCE GUARANTEES AND MAXIMUM SERVICE RATE CONTROL

(75) Inventors: Yea-Li Sun, 11F, No. 28, Lane 16, Kuo-Hsing Street, Hsichih City, Taipei Hsien (TW); Jeng-Farn Lee, Hsin-Tien (TW)

(73) Assignee: Yea-Li Sun, Hsichi (TW)

( * ) Notice: Subject to any disclaimer, the term of this patent is extended or adjusted under 35 U.S.C. 154(b) by 1050 days.

(21) Appl. No.: 10/155,363

(22) Filed: May 23, 2002

(65) Prior Publication Data

US 2003/0219026 A1    Nov. 27, 2003

(51) Int. Cl.
*H04L 12/54*    (2006.01)
(52) U.S. Cl. ........................... 370/232; 370/412
(58) Field of Classification Search ................ 370/230, 370/232–234, 412–418
See application file for complete search history.

(56) References Cited

U.S. PATENT DOCUMENTS

| | | | |
|---|---|---|---|
| 5,394,396 A | 2/1995 | Yoshimura et al. | |
| 6,052,375 A | 4/2000 | Bass et al. | |
| 6,061,348 A | 5/2000 | Castrigno et al. | |
| 6,072,772 A * | 6/2000 | Charny et al. | 370/229 |
| 6,111,877 A | 8/2000 | Wilford et al. | |
| 6,314,106 B1 | 11/2001 | King et al. | |
| 6,317,416 B1 * | 11/2001 | Giroux et al. | 370/232 |
| 6,438,135 B1 * | 8/2002 | Tzeng | 370/412 |
| 6,480,911 B1 * | 11/2002 | Lu | 710/54 |
| 6,850,540 B1 * | 2/2005 | Peisa et al. | 370/468 |
| 2003/0081623 A1 * | 5/2003 | Kiremidjian et al. | 370/412 |

FOREIGN PATENT DOCUMENTS

EP    1 130 877    9/2001

OTHER PUBLICATIONS

Parekh et al., "A generalized processor sharing approach to flow control in integrated services networks: the single-node case," *IEEE/ACM Transactions on Networking*, 1:3, pp. 344-357 (1993).
Bennett et al., "WF²Q: Worst-case fair weighted fair queueing," *IEEE/ACM Transactions on Networking*, pp. 120-128 (1996).

* cited by examiner

*Primary Examiner*—Hassan Kizou
*Assistant Examiner*—Salman Ahmed
(74) *Attorney, Agent, or Firm*—Merchant & Gould P.C.

(57) ABSTRACT

In a method and multi-queue packet scheduling system for managing network packet traffic, each of a plurality of output buffer queues is assigned with a reserved weight in bandwidth sharing of an output link, is associated with a respective service class, and may be optionally assigned with a maximum rate to constrain packet transmission therethrough. The output buffer queues are adapted for enqueueing incoming packets therein according to associated service classes of the incoming packets. A shared bandwidth rate calculator determines in real-time shared bandwidth rates of maximum-rate constrained backlogged output buffer queues with reference to the reserved weights and such that the shared bandwidth rates do not exceed the assigned maximum rates. A packet scheduler transmits outgoing packets from the backlogged output buffer queues in accordance with a schedule that is based on the shared bandwidth rates determined by the shared bandwidth rate calculator.

16 Claims, 8 Drawing Sheets

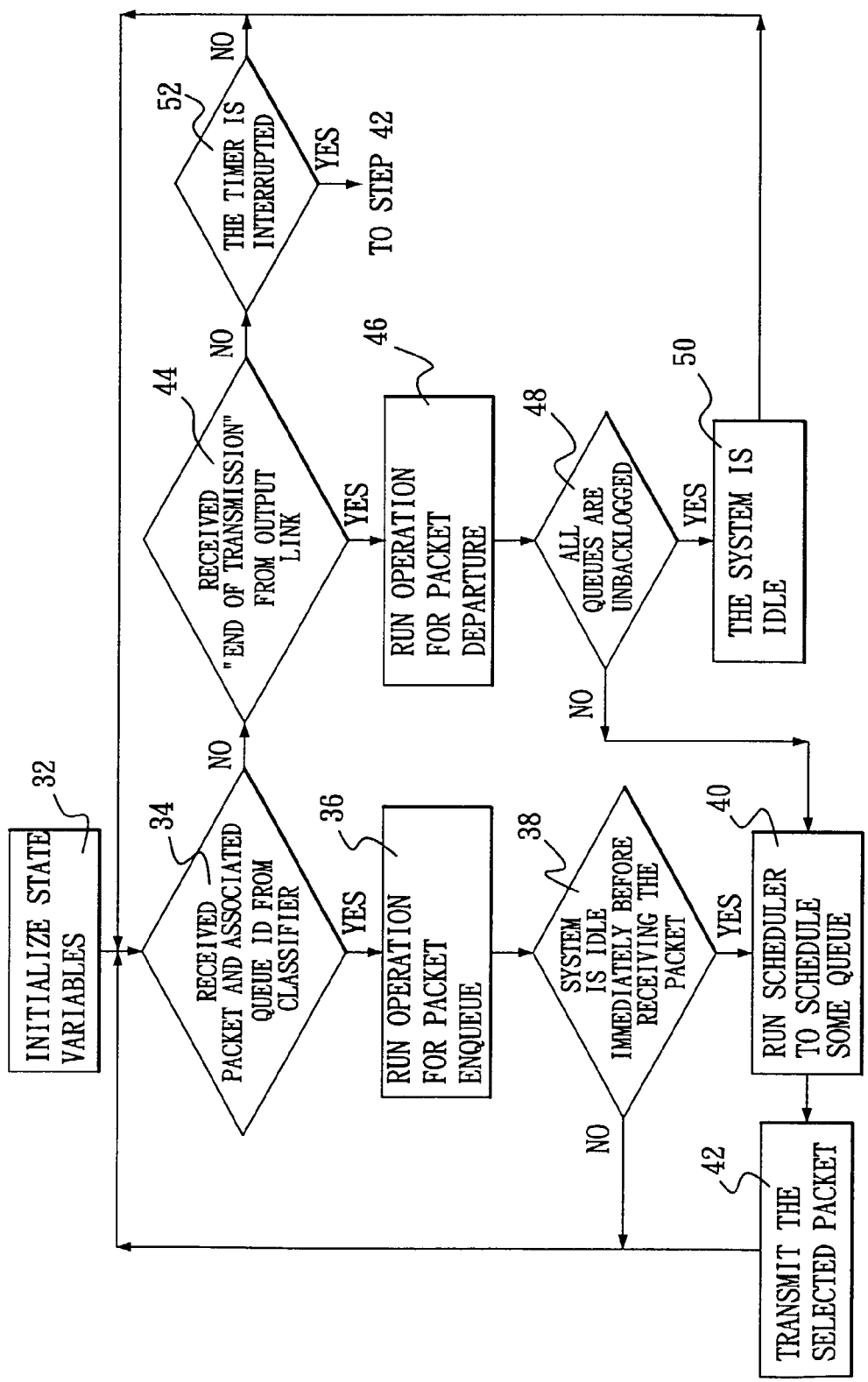
F I G. 2

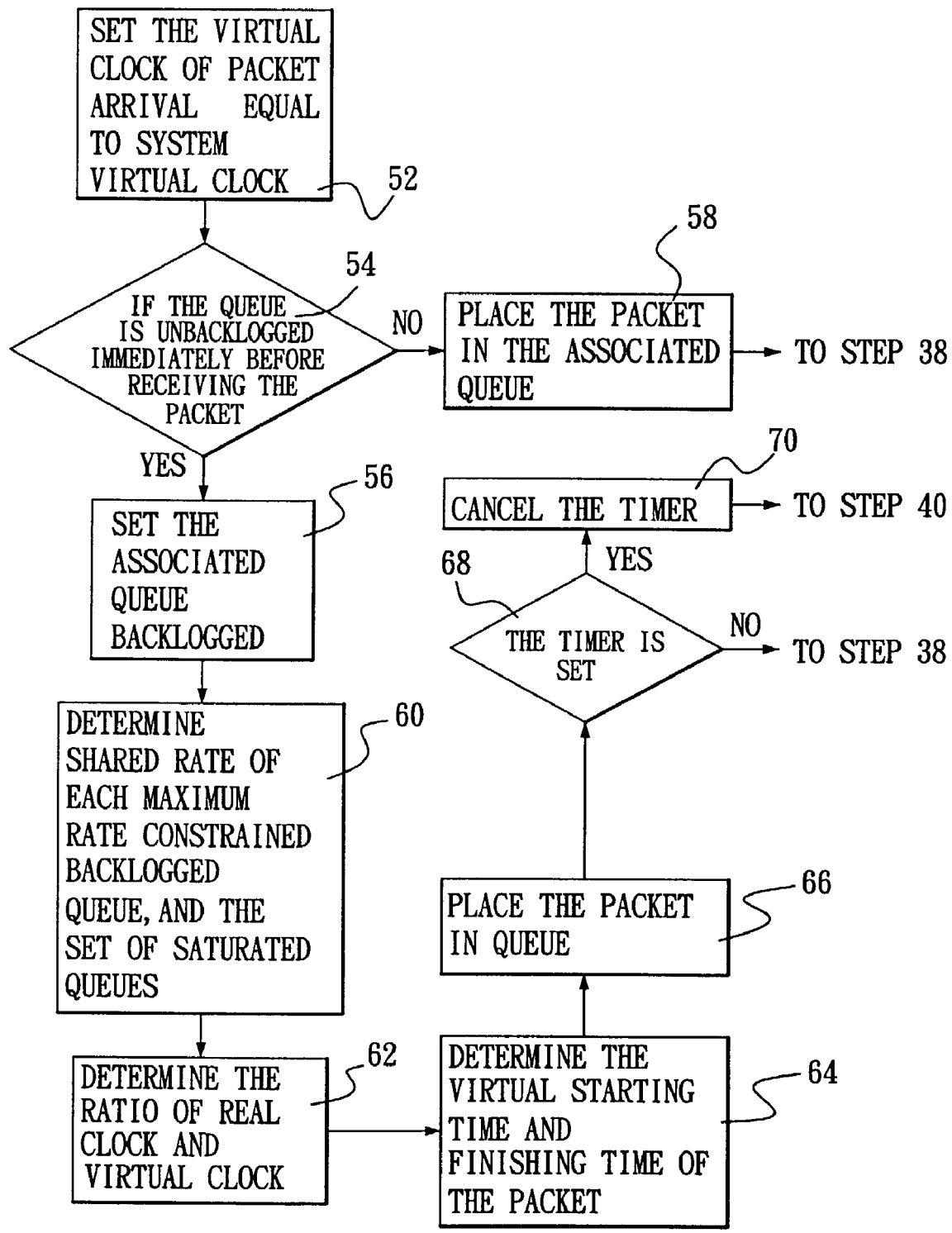
F I G. 3

METHOD AND MULTI-QUEUE PACKET SCHEDULING SYSTEM FOR MANAGING NETWORK PACKET TRAFFIC WITH MINIMUM PERFORMANCE GUARANTEES AND MAXIMUM SERVICE RATE CONTROL

BACKGROUND OF THE INVENTION

1. Field of the Invention

The invention relates to a method for managing packet traffic in Internet applications, more particularly to a method and multi-queue packet scheduling system for managing network packet traffic with minimum performance guarantees and maximum service rate control.

2. Description of the Related Art

U.S. Pat. Nos. 6,072,772 and 6,317,416 disclose conventional packet scheduling systems that are capable of supporting different service classes. The different service classes differ primarily in their Quality of Service (QoS) requirements, such as throughput, delay, delay jitter and loss rate. The prior art has also recognized the importance of maintaining minimum performance guarantees for the different service classes. Many algorithms have been proposed heretofore to ensure minimum performance guarantees. See, for example, A. K. Parekh and R. G. Gallager, "A Generalized Processor Sharing Approach to Flow Control in Integrated Services Networks: The Single-Node Case", IEEE/ACM Transactions on Networking, Vol. 1, No. 3, pp. 344–357, June 1993; J. C. R. Bennett and H. Zhang, "$WF^2Q$: Worst-case Fair Weighted Fair Queueing", Proc. IEEE INFOCOM '96; and others.

In WFQ and $WF^2Q$, each service class is assigned with a reserved weight in bandwidth sharing of an output link. WFQ and $WF^2Q$ provide a minimum rate guarantee for each service class that is equal to the product of the link capacity and the quotient of the reserved weight of the service class divided by the total reserved weight of the service classes. The shared bandwidth rate of each service class is equal to the product of the link capacity and the quotient of the reserved weight of the service class divided by the total reserved weight of backlogged ones of the service classes.

However, while the known service disciplines provide minimum performance guarantees, they lack maximum service rate control. Without maximum service rate control, leased line customers may use more bandwidth than what they paid for. In other words, customers do not pay more for higher service rates, which is to the disadvantage of carriers and service providers. Moreover, without maximum service rate control, total outgoing traffic attributed to specific applications or organizations cannot be restricted to enforce management policies. In addition, for some service classes, such as video or audio service classes, extra requests for the sharing of bandwidth from other unbacklogged service classes are not admissible because the amount of shared bandwidth is not predictable. Furthermore, for some multimedia streaming applications, use of higher-than-designed bandwidth can overflow the receiving buffer such that the service quality is degraded. There is thus a need to ban excess bandwidth sharing for specific service classes and applications.

SUMMARY OF THE INVENTION

Therefore, the object of the present invention is to provide a method and multi-queue packet scheduling system for managing network packet traffic with minimum performance guarantees and maximum service rate control so as to overcome the aforesaid drawbacks commonly associated with the prior art.

The present invention achieves several important goals. It provides statistic delay and bandwidth guarantees, and ensures the bandwidth and delay guarantees to all service classes independently of the behavior of other flows. It also allows arbitrary assignment of guaranteed rates. Additionally, it allows flexibility in quick admission of new service classes and changing of reserved bandwidth rates of existing service classes. Moreover, it can provide maximum service rate control and distribute excess bandwidth to other service classes according to the reserved bandwidth rates.

According to one aspect of the invention, a method for managing network packet traffic with minimum performance guarantees and maximum service rate control comprises the steps of:

a) assigning each of a plurality of output buffer queues with a reserved weight in bandwidth sharing of an output link, each of the output buffer queues being associated with a respective service class;

b) optionally assigning at least one of the output buffer queues with a maximum rate to constrain packet transmission through said at least one of the output buffer queues;

c) enqueueing incoming packets in the output buffer queues according to associated service classes of the incoming packets;

d) determining in real-time shared bandwidth rates of maximum-rate constrained backlogged ones of the output buffer queues with reference to the reserved weights of the backlogged ones of the output buffer queues and such that the shared bandwidth rate of each maximum-rate constrained backlogged one of the output buffer queues does not exceed the maximum rate which is assigned thereto; and e) transmitting outgoing packets from the backlogged ones of the output buffer queues in accordance with a schedule that is based on the shared bandwidth rates determined in step d).

According to another aspect of the invention, a multi-queue packet scheduling system for managing network packet traffic with minimum performance guarantees and maximum service rate control comprises:

a plurality of output buffer queues, each of which is assigned with a reserved weight in bandwidth sharing of an output link and each of which is associated with a respective service class, at least one of the output buffer queues being optionally assigned with a maximum rate to constrain packet transmission through said at least one of the output buffer queues, the output buffer queues being adapted for enqueueing incoming packets therein according to associated service classes of the incoming packets;

a shared bandwidth rate calculator for determining in real-time shared bandwidth rates of maximum-rate constrained backlogged ones of the output buffer queues with reference to the reserved weights of the backlogged ones of the output buffer queues and such that the shared bandwidth rate of each maximum-rate constrained backlogged one of the output buffer queues does not exceed the maximum rate which is assigned thereto; and a packet scheduler associated operably with the shared bandwidth rate calculator and the output buffer queues for transmitting outgoing packets from the backlogged ones of the output buffer queues in accordance with a schedule that is based on the shared bandwidth rates determined by the shared bandwidth rate calculator.

BRIEF DESCRIPTION OF THE DRAWINGS

Other features and advantages of the present invention will become apparent in the following detailed description of the preferred embodiment with reference to the accompanying drawings, of which:

FIG. 2 is a flow diagram illustrating the preferred embodiment of a method for managing network packet traffic with minimum performance guarantees and maximum service rate control according to the present invention;

FIG. 3 is a flow diagram to illustrate a packet enqueue operation of the preferred embodiment of this invention;

DETAILED DESCRIPTION OF THE PREFERRED EMBODIMENT

Figure 1:
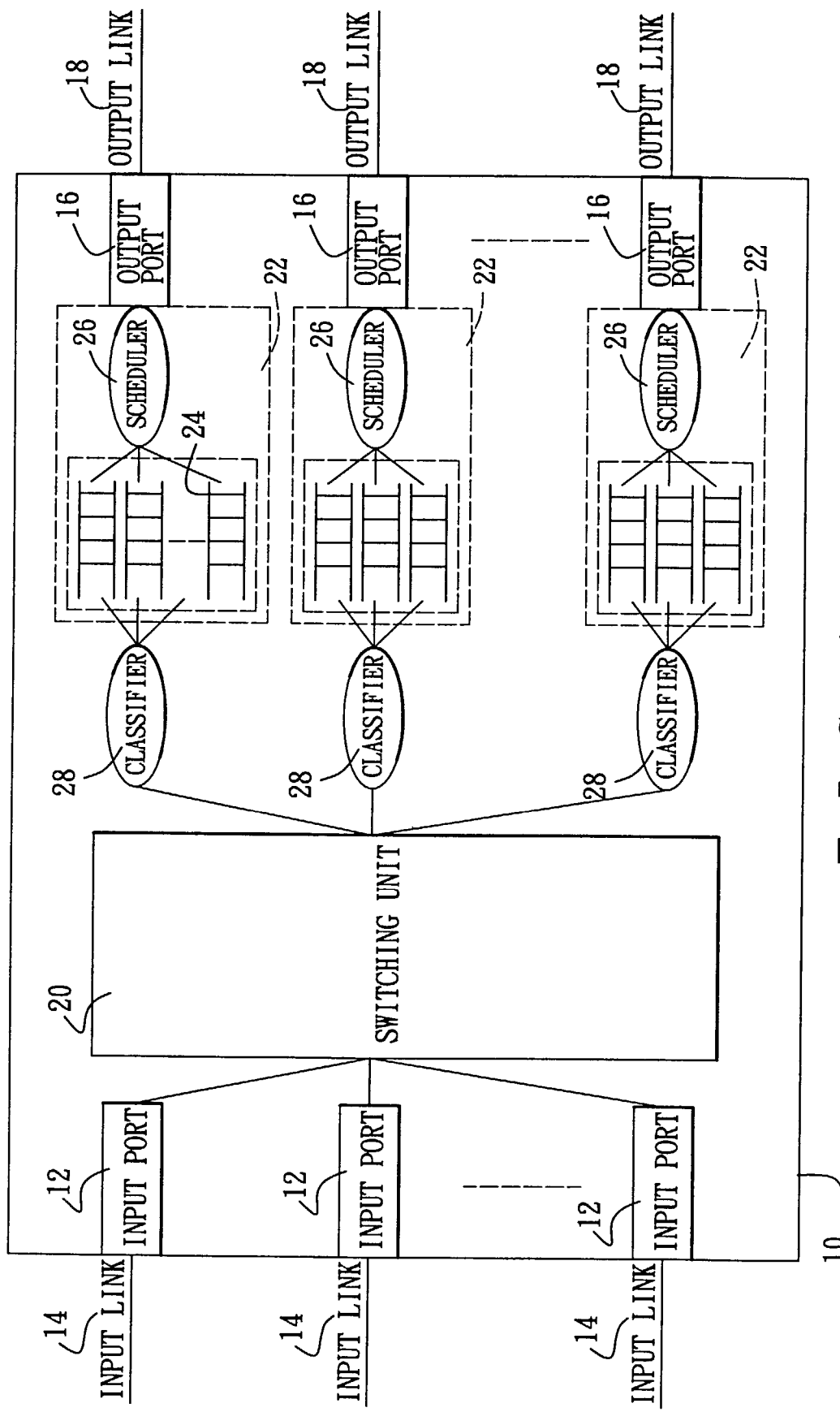
FIG. 1 illustrates an output-buffered switch/router that incorporates the multi-queue packet scheduling system of the present invention.

Referring to FIG. 1, there is shown an output-buffered switch/router 10 that incorporates the multi-queue packet scheduling system 22 of the present invention. The switch/router 10 is a device having a number "n" of input ports 12, and a number "m" of output ports 16. Each of the input ports 12 corresponds to a physical input link 14, whereas each of the output ports 16 corresponds to a physical output link 18. The input ports 12 are connected to the output ports 16 by way of a switching unit 20, which is responsible for the transfer of packets from the input ports 12 to the output ports 16. The switching unit 20 includes a switching fabric of a known construction, the details of which are omitted herein for the sake of brevity.

In the switch/router 10, the capacities of individual links 14, 18 may differ from each other. Each output link 18 is associated with a number of output buffer queues, each of which corresponds to a different QoS service class or flow. While the following description focuses on a single output link 18, it should be noted that the same description is applicable to any other output link 18.

In FIG. 1, each output link 18 is associated with a corresponding multi-queue packet scheduling system 22, which includes a plurality of first-in, first-out (FIFO) output buffer queues 24 and a packet scheduler 26. Packet classifiers 28 are responsible for classifying and directing incoming packets to the respective output buffer queue 24 in a known manner according to some portion of the data contained in the packets based on some pre-defined policies/rules. Packets for a given output link 18 are thus buffered at the queues 24 and wait for transmission. The packet scheduler 26 in each packet scheduling system 22 is responsible for selecting a packet from among the output buffer queues 24 to guarantee bandwidth, delay and maximum service rate control simultaneously.

Figure 1A:
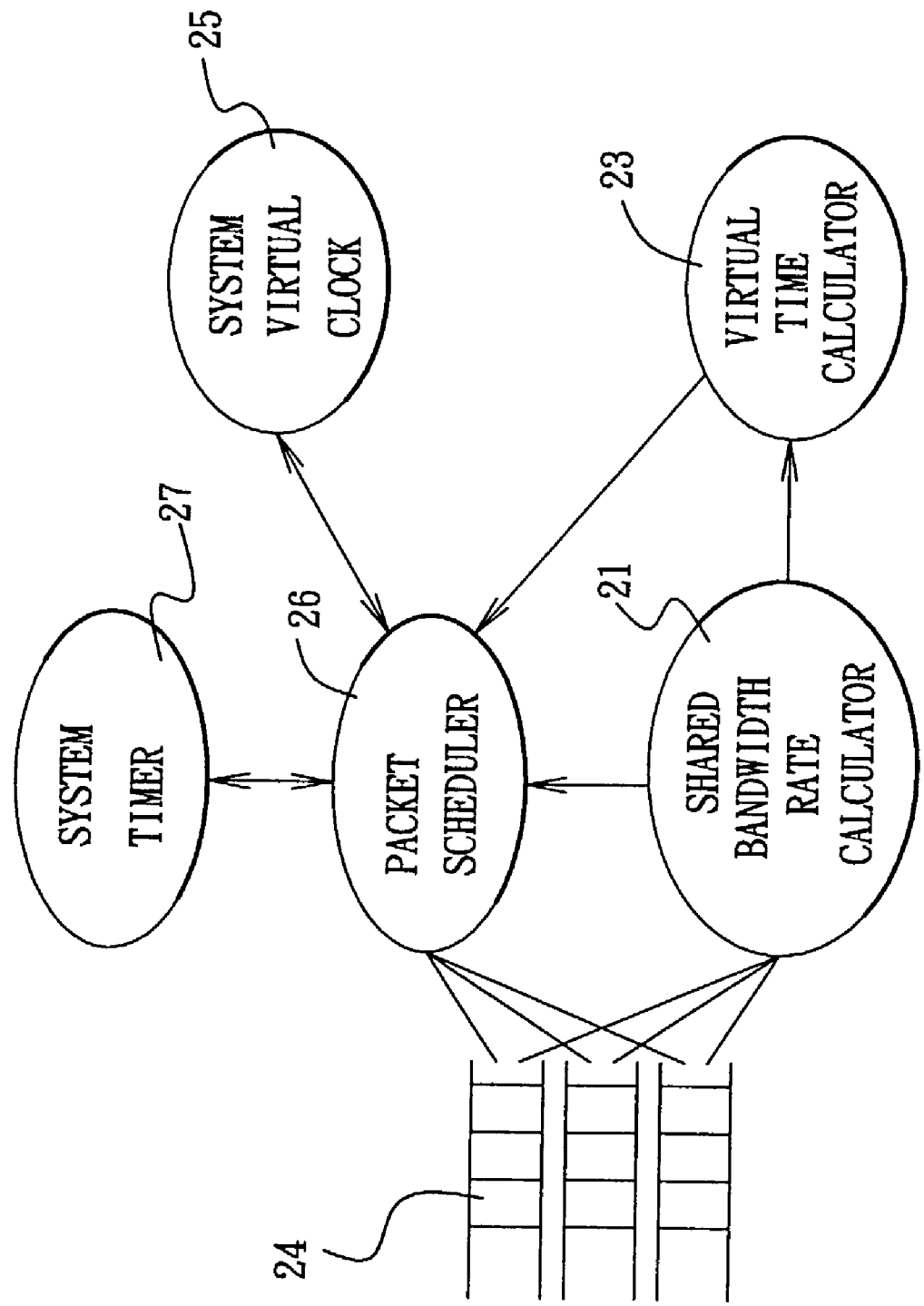
FIG. 1A is a functional block diagram of the preferred embodiment of the multi-queue packet scheduling system according to this invention.

FIG. 1A illustrates the preferred embodiment of the multi-queue packet scheduling system 22 of this invention in greater detail. Aside from the output buffer queues 24 and the packet scheduler 26, the packet scheduling system 22 further includes a shared bandwidth rate calculator 21, a virtual time calculator 23, a system virtual clock 25 managed by the packet scheduler 26, and a system timer 27. The relevant operations of the various functional components of the packet scheduling system 22 will be explained in detail in the succeeding paragraphs.

FIG. 2 is a flowchart to illustrate the operation of the multi-queue packet scheduling system 22 according to this invention. In this invention, each output buffer queue 24 is assigned with a reserved weight ($\phi_i$) in bandwidth sharing of the corresponding output link 18. Moreover, each output buffer queue 24 is optionally assigned with a maximum rate ($P_i$) to constrain packet transmission therethrough. As shown in FIGS. 1, 1A and 2, the operation of the multi-queue packet scheduling system 22 begins in step 32, where state variables are initialized, and the reserved weight ($\phi_i$) and the maximum rate ($P_i$) are assigned to each output buffer queue 24. Note that the maximum rate ($P_i$) is set to 0 if the associated output buffer queue 24 is not maximum-rate constrained. The multi-queue packet scheduling system 22 is event-driven by three types of events: receipt of a packet from the packet classifier 28 (Packet Arrival); packet completely sent out over the corresponding output link 18 (Packet Departure); and interrupt of the system timer 27. In step 34, it is determined if an incoming packet and its associated queue identifier were received from the packet classifier 28. In the affirmative, the operation for packet enqueue is invoked in step 36. The operation for packet enqueue will be discussed in detail in the succeeding paragraphs with reference to FIG. 3. In the negative, it is determined in step 44 if an "end of transmission" interrupt was received from the corresponding output link 18. In the affirmative, the operation for packet departure is invoked in step 46. The operation for packet departure will be discussed in detail in the succeeding paragraphs with reference to FIG. 4. In the negative, it is determined in step 52 if the system timer 27 is interrupted, which will be discussed in more detail hereinafter. In the affirmative, the flow goes to step 42 for packet transmission. Otherwise, the flow goes back to step 34.

From step 36, the flow can proceed to step 38, where it is determined if the packet scheduling system 22 was idle immediately before receiving the incoming packet from the packet classifier 28. If idle, the flow goes to step 40, where the packet scheduler 26 schedules the next packet to be transmitted over the corresponding output link 18, and the packet scheduling system 22 begins a new busy period. The operation of the packet scheduler 26 will be discussed in more detail hereinafter with reference to FIG. 5. Otherwise, the flow goes to step 34. After step 40, the flow proceeds to step 42, where the packet scheduling system 22 transmits the scheduled packet over the corresponding output link 18, and the flow goes back to step 34.

From step 46, the flow proceeds to step 48, where it is determined if all output buffer queues 24 are unbacklogged after an "end of transmission" from the corresponding output link 18. As defined herein, an output buffer queue 24 is unbacklogged if it is empty. In the affirmative, the packet scheduling system 22 enters an idle state in step 50, and the flow goes back to step 34. Otherwise, the flow goes to step 40 for packet transmission scheduling.

The packet enqueue operation will now be described with further reference to FIG. 3. In the present invention, if a backlogged output buffer queue 24 with a maximum-rate constraint is initially determined to have a shared bandwidth rate in the corresponding WF²Q scheme that exceeds its assigned maximum rate ($P_i$), the backlogged output buffer queue 24 is called a saturated queue. The shared bandwidth rate of the saturated queue is limited to its assigned maximum rate ($P_i$), and the remaining bandwidth is shared by the non-saturated backlogged output buffer queues according to their reserved weights ($\phi_i$) as in the corresponding WF²Q scheme. In order to provide bandwidth and delay guarantees and maximum service rate constraint at the same time, the packet scheduling system 22 uses Worst-case Fair Weighted Fair Queueing with Maximum Service Rate Control (WF²Q-M), which is an extension of the known service discipline WF²Q. Moreover, a system virtual clock 25 (see FIG. 1A) is maintained by the packet scheduler 26. The system virtual clock 25 in WF²Q-M is the normalized amount of service that a non-saturated backlogged output buffer queue 24 should receive. The system virtual clock 25 is set to 0 in step 32 of FIG. 2, and is updated at a rate of 1/ratio(t), where the ratio(t) is a clock mapping ratio for mapping a system real clock to the system virtual clock 25 at time (t) and is a function of the total reserved weights of the saturated and backlogged queues. This will be explained in greater detail with reference to FIG. 6.

Referring to FIGS. 1A and 3, the packet enqueue operation begins in step 52, wherein upon receipt of an incoming packet from the packet classifier 28, the packet scheduler 26 updates the system virtual clock 25 and sets the virtual clock of packet arrival to the system virtual clock 25. Thereafter, it is determined in step 54 if the associated output buffer queue 24 is empty or unbacklogged immediately before receiving the incoming packet. If yes, the associated output buffer queue 24 is set to be backlogged in step 56, and the flow proceeds to step 60. Otherwise, the incoming packet is placed at the tail of the associated output buffer queue 24 in step 58, and the flow then proceeds to step 38. When the set of backlogged output buffer queues 24 in the packet scheduling system 22 changes, the clock mapping ratio ratio(t) should be changed accordingly. Therefore, in step 60, the shared bandwidth rate calculator 21 calculates the shared bandwidth rate of each maximum-rate constrained backlogged output buffer queue 24, and determines the set of saturated queues therefrom. As mentioned hereinbefore, if the shared bandwidth rate of a maximum-rate constrained backlogged output buffer queue 24 is initially determined by the shared bandwidth rate calculator 21 to exceed its assigned maximum rate ($P_i$), the backlogged output buffer queue 24 is deemed to be a saturated queue. The shared bandwidth rate calculator 21 sets the shared bandwidth rate of the saturated queue to its assigned maximum rate ($P_i$) such that saturated queues are designed for servicing at their assigned maximum rates ($P_i$) in the packet scheduling system 22 of this invention. The shared bandwidth rate calculator 21 then distributes the remaining bandwidth to the non-saturated backlogged output buffer queues 24 according to their reserved weights ($\phi_i$) as in the corresponding WF²Q scheme. Note that when non-saturated backlogged output buffer queues 24 receive the excess bandwidth from the initial set of saturated queues, some of them may get saturated. Upon detection of a new saturated queue, the shared bandwidth rate calculator 21 is configured to distribute the remaining bandwidth to the remaining non-saturated backlogged output buffer queues 24 once again.

Figure 6:
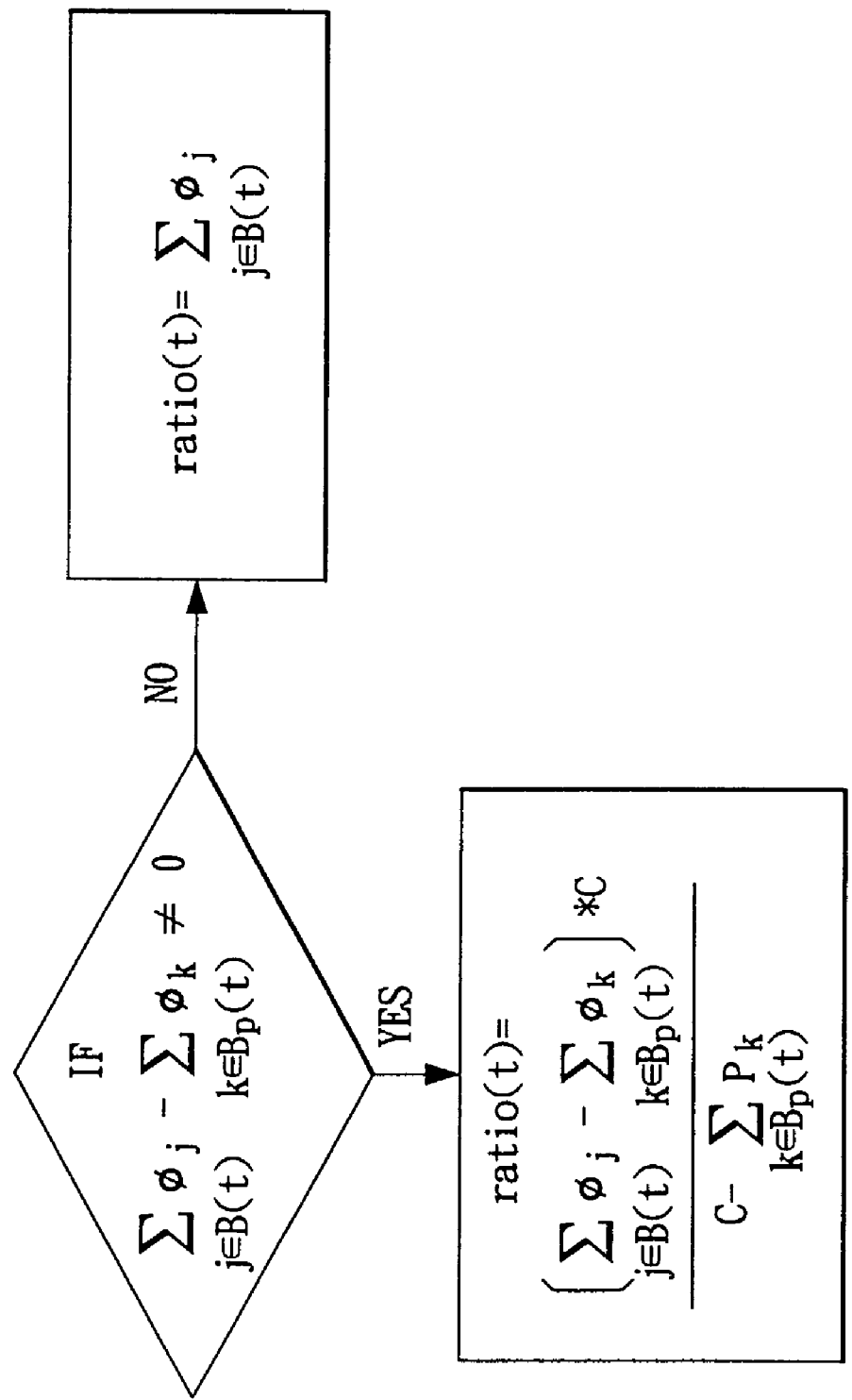
FIG. 6 is a flow diagram to illustrate how a clock mapping ratio is calculated by a virtual time calculator in the preferred embodiment of this invention.

After the shared bandwidth rates for all maximum-rate constrained backlogged output buffer queues have been calculated by the shared bandwidth rate calculator 21, the flow proceeds to step 62 in FIG. 3. In step 62, the virtual time calculator 23 calculates the clock mapping ratio ratio(t) for mapping the system real clock to the system virtual clock 25. The relevant operation is shown in FIG. 6. When the difference between the total reserved weight of the backlogged output buffer queues 24, i.e.

$$\sum_{j \in B(t)} \phi_j,$$

and the total reserved weight of the saturated queues 24, i.e.

$$\sum_{k \in Bp(t)} \phi_k,$$

is equal to zero, the clock mapping ratio ratio(t) is equal to the total reserved weight of the backlogged output buffer queues 24. Otherwise, the clock mapping ratio ratio(t) is calculated as a function of the total reserved weight of the backlogged output buffer queues 24, i.e.

$$\sum_{j \in B(t)} \phi_j,$$

the total reserved weight of the saturated queues 24, i.e.

$$\sum_{k \in Bp(t)} \phi_k,$$

and the total bandwidth shared by the non-saturated backlogged output buffer queues 24 after receiving excess bandwidth from the saturated queues 24, i.e.

$$C - \sum_{k \in Bp(t)} P_k.$$

Figure 7:
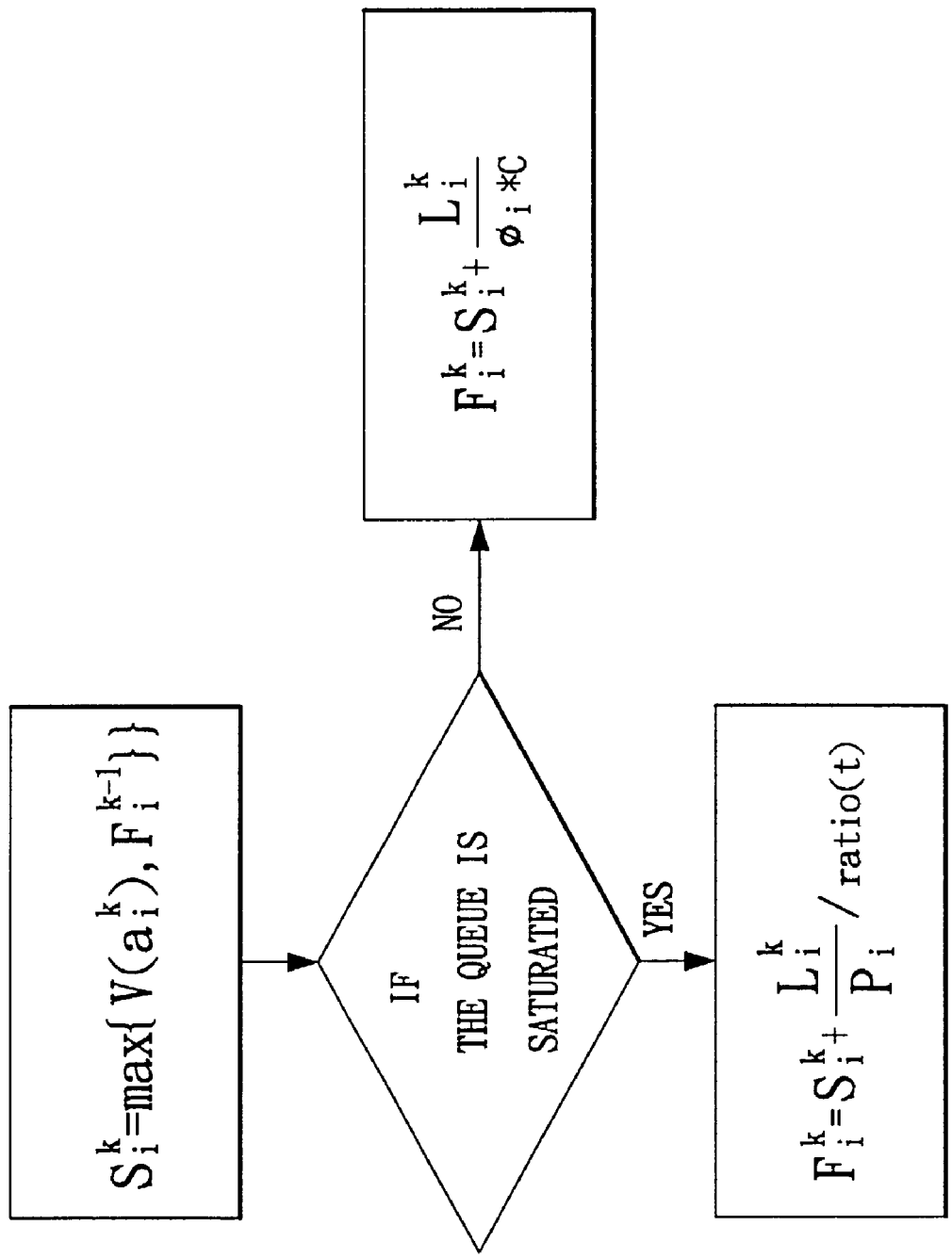
FIG. 7 is a flow diagram to illustrate how virtual starting and virtual finishing times are determined by the virtual time calculator in the preferred embodiment of this invention.

In the packet scheduling system 22 of this invention, the virtual time calculator 23 (see FIG. 1A) assigns each packet with a virtual starting time and a virtual finishing time, which values correspond respectively to the virtual clocks when a packet should start and finish servicing. In order to minimize the overhead and cost in maintaining virtual starting and virtual finishing times, the system virtual clock 25 is recorded as the packet virtual arrival time when the packet enters the packet scheduling system 22, and the virtual time calculator 23 computes the virtual starting and finishing times for the packet at the head of each of the backlogged output buffer queues 24. Thus, after step 62 in FIG. 3, the flow proceeds to step 64, where the virtual starting and finishing times of the packet at the head of the associated output buffer queue 24 are determined by the virtual time calculator 23. The relevant operation is shown in FIG. 7. The virtual starting time ($S_i^k$) is the larger between the virtual arrival time ($V(a_i^k)$) and the virtual finishing time ($F_i^{k-1}$) of a preceding packet at the head of the associated output buffer queue 24. If the associated output buffer queue 24 is a non-saturated backlogged output buffer queue, the virtual time calculator 23 determines the virtual finishing time ($F_i^k$) of the packet to be equal to the sum of the virtual starting time ($S_i^k$) and the quotient of the length ($L_i^k$) of the packet divided by the product of the reserved weight ($\phi_i$) of the associated output buffer queue 24 and the link capacity (C) of the corresponding output link 18. If the associated output buffer queue 24 is a saturated backlogged output buffer queue 24, the virtual time calculator 23 determines the virtual finishing time ($F_i^k$) of the packet to be equal to the sum of the virtual starting time ($S_i^k$) and the quotient of the length ($L_i^k$) of the packet divided by the product of the assigned maximum rate ($P_i$) of the associated output buffer queue 24 and the clock mapping ratio ratio(t).

Referring once again to FIG. 3, from step 64, the flow proceeds to step 66, where the incoming packet is placed in the associated output buffer queue 24. Then, in step 68, it is determined if the system timer 27 (see FIG. 1A) was set, which will be described in greater detail hereinafter. If no, the flow goes to step 38 in FIG. 2. Otherwise, the system timer 27 is canceled in step 70, and the flow goes immediately to step 40 in FIG. 2.

Figure 4:
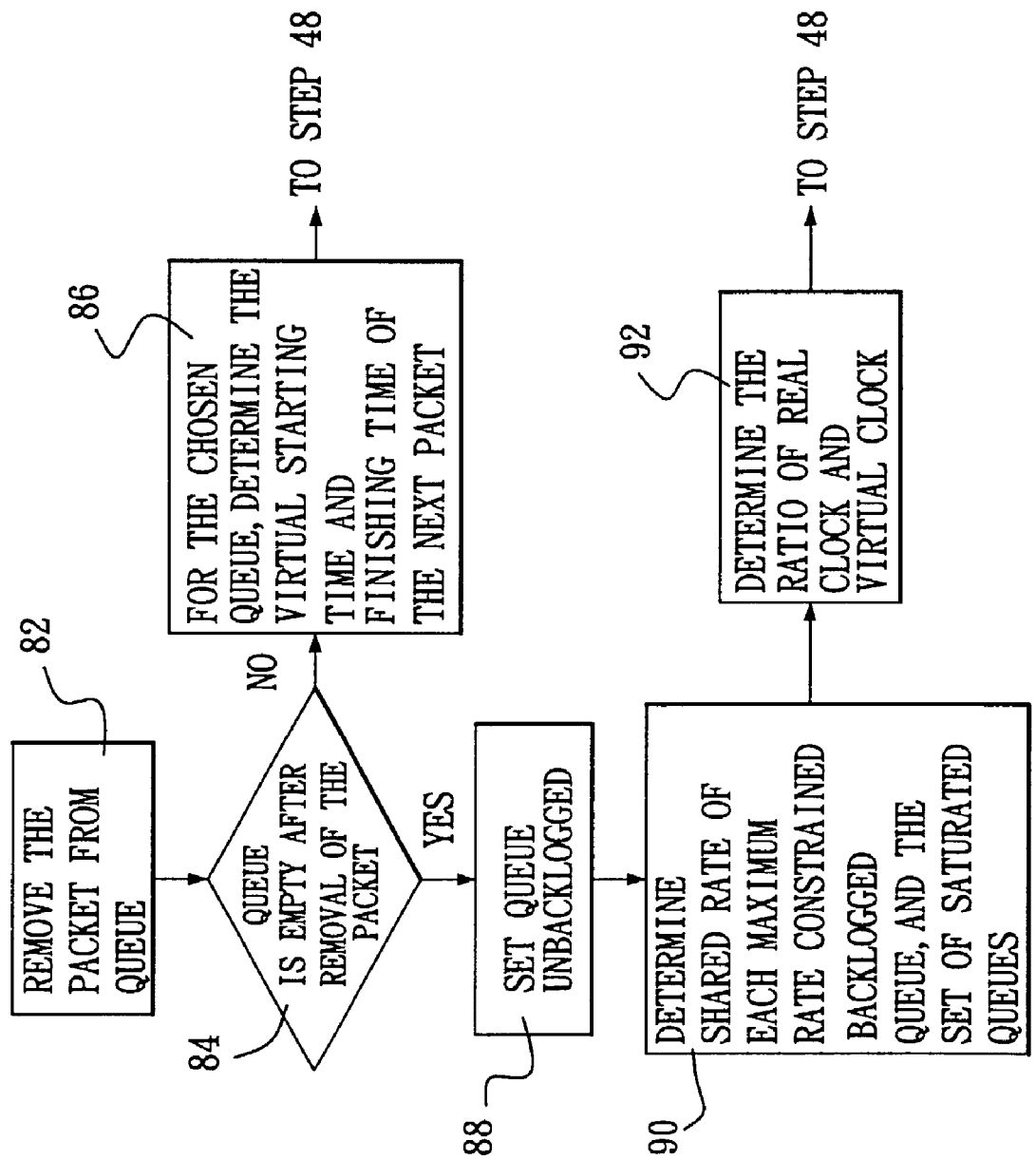
FIG. 4 is a flow diagram to illustrate a packet departure operation of the preferred embodiment of this invention.

With reference to FIGS. 1A and 4, the packet departure operation begins in step 82, where the packet scheduler 26 removes the outgoing packet from the departed output buffer queue 24. Subsequently, in step 84, the departed output buffer queue 24 is checked to determine if it is empty. If no, the flow proceeds to step 86, where the virtual starting and finishing times of the next packet at the head of the departed output buffer queue 24 are determined by the virtual time calculator 23 in the manner described beforehand, and then to step 48 in FIG. 2. Otherwise, the flow proceeds to step 88, where the departed output buffer queue 24 is set to unbacklogged. Then, similar to steps 60 and 62 in FIG. 3, the shared bandwidth rate calculator 21 calculates the shared bandwidth rate of each maximum-rate constrained backlogged output buffer queue 24 and determines the updated set of saturated queues in step 90, and the virtual time calculator 23 determines the clock mapping ratio ratio (t) in step 92. The flow then proceeds to step 48 in FIG. 2.

Figure 5:
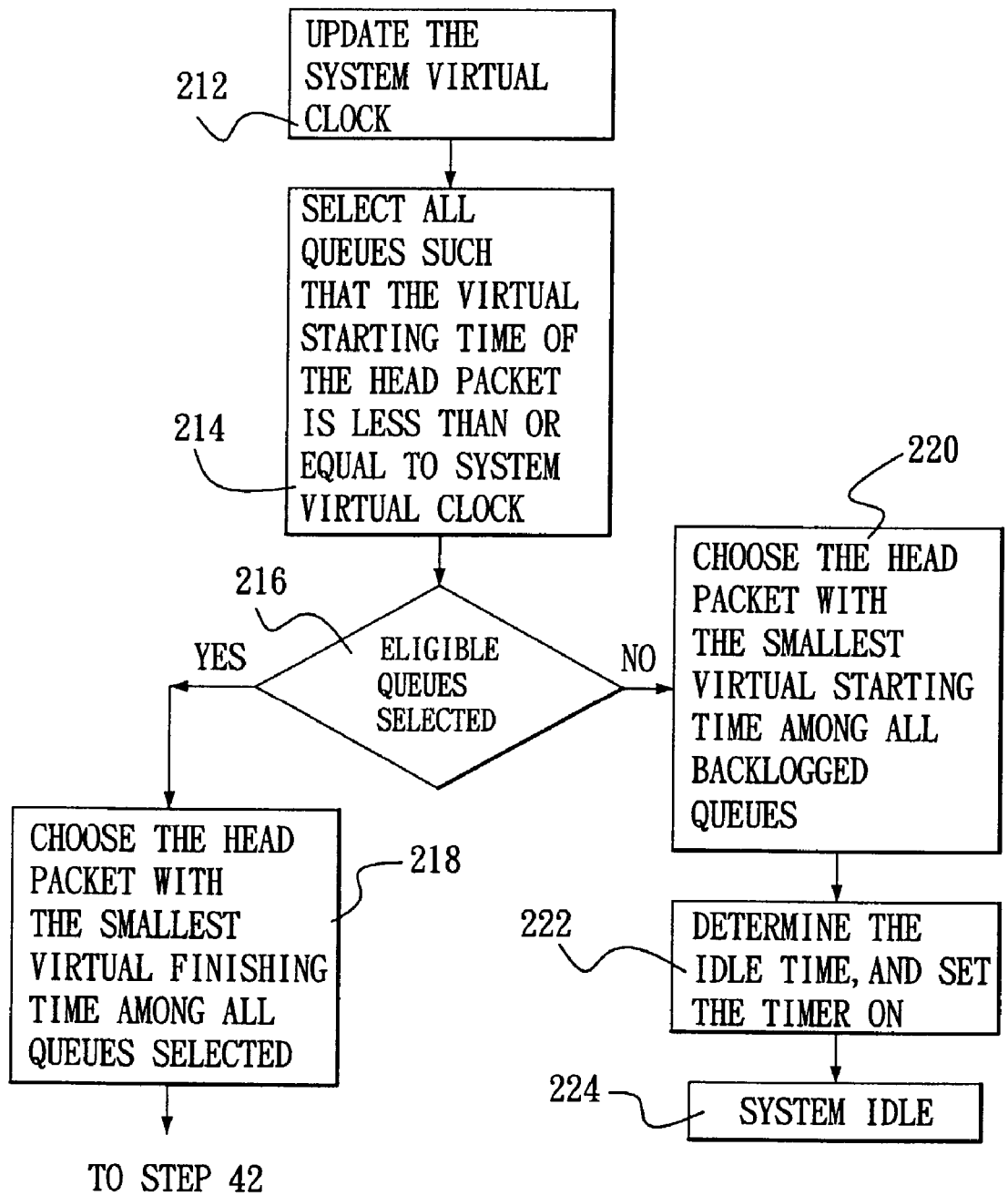
FIG. 5 is a flow diagram to illustrate the operation of a packet scheduler of the preferred embodiment of this invention.

The operation of the packet scheduler 26 will now be described with reference to FIG. 5. When scheduling packets for transmission over the corresponding output link 18, the packet scheduler 26 only considers the set of packets at the heads of the backlogged output buffer queues 24 whose virtual starting times are less than the system virtual clock 25, and selects the packet having the smallest virtual finishing time. Upon detection that there is no eligible packet at time (t), the packet scheduler 26 selects the packet at the head of one of the backlogged output buffer queues 24 having the smallest virtual starting time, determines an idle period for the selected packet, and sets the system timer 27 (see FIG. 1A) for the idle period. When the system timer 27 expires, i.e. system timer interrupt as indicated by step 52 in FIG. 2, the packet scheduler 26 services the selected packet, and the packet scheduling system 22 starts a busy period. When the system timer 27 is set, a change in the status of one of the output buffer queues 24 from unbacklogged to backlogged will cancel the system timer 27 (see FIG. 3) and will cause the packet scheduler 26 to select the next packet for transmission over the corresponding output link 18. Therefore, as best shown in FIG. 5, operation of the packet scheduler 26 begins in step 212 with updating of the system virtual clock 25. Thereafter, in step 214, the packet scheduler 26 selects all eligible output buffer queues 24, i.e. backlogged output buffer queues 24 having a head packet whose virtual starting time is less than or equal to the system virtual clock 25. In step 216, it is determined if eligible output buffer queues 24 were selected. If yes, the eligible output buffer queue 24 having the head packet with the smallest virtual finishing time is selected as a scheduled queue in step 218. Ties are broken arbitrarily, and the flow then proceeds to step 42 in FIG. 2 for transmission of the scheduled head packet over the corresponding output link 18. Otherwise, in step 220, the output buffer queue 24 having the head packet with the smallest virtual starting time is selected. Then, in step 222, the packet scheduler 26 determines the system idle time as a function of the clock mapping ratio ratio(t), sets up the system timer 27, and the packet scheduling system 22 becomes idle (step 224) until the system timer 27 is interrupted, during which time the flow proceeds to step 42 in FIG. 2, or until a new packet arrives to an unbacklogged output buffer queue 24, during which time the flow proceeds to step 36 in FIG. 2.

It has thus been shown that the method and system of this invention can guarantee minimum service rates and provide maximum service rate constraint simultaneously. By merging the maximum service rate control mechanism into the virtual starting and finishing time calculations, overall scheduling complexity can be reduced. Moreover, the virtual clock adjustment allows the sharing of excess bandwidth without recalculating virtual starting and finishing times of the packets of non-saturated output buffer queues.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A method for managing network packet traffic with minimum performance guarantees and maximum service rate control, comprising the steps of:

a) assigning each of a plurality of output buffer queues with a reserved weight in bandwidth sharing of an output link, each of the output buffer queues being associated with a respective service class;

b) optionally assigning at least one of the output buffer queues with a maximum rate to constrain packet transmission through said at least one of the output buffer queues;

c) enqueueing incoming packets in the output buffer queues according to associated service classes of the incoming packets;

d) determining in real-time shared bandwidth rates of maximum-rate constrained backlogged ones of the output buffer queues with reference to the reserved weights of the backlogged ones of the output buffer queues and such that the shared bandwidth rate of each maximum-rate constrained backlogged one of the output buffer queues does not exceed the maximum rate which is assigned thereto; and e) transmitting outgoing packets from the backlogged ones of the output buffer queues in accordance with a schedule that is based on the shared bandwidth rates determined in step d);

wherein each of the output buffer queues is a first-in, first-out buffer queue, said method further comprising, prior to step e), the step of calculating virtual starting and virtual finishing times for the packet at the head of each of the backlogged ones of the output buffer queues to determine when the packet should start and finish servicing, the virtual starting and virtual finishing times being calculated with reference to the reserved weights of the output buffer queues and the shared bandwidth rates determined in step d).

2. The method as claimed in claim 1, wherein step e) includes the sub-step of selecting the packet at the head of one of the backlogged ones of the output buffer queues having the virtual starting time thereof less than a system virtual clock and further having the smallest virtual finishing time for transmission.

3. The method as claimed in claim 2, wherein step e) further includes the sub-steps of, when the virtual starting time of the packet at the head of each of the backlogged ones of the output buffer queues is not less than the system virtual clock, selecting the packet at the head of one of the backlogged ones of the output buffer queues having the smallest virtual starting time, determining an idle period for the selected packet, setting a timer for the idle period, and transmitting the selected packet when the timer expires.

4. The method as claimed in claim 3, wherein the timer is canceled upon detection of a change in status of one of the output buffer queues from unbacklogged to backlogged.

5. The method as claimed in claim 2, wherein step d) includes the sub-steps of:
determining a set of saturated queues from the backlogged ones of the output buffer queues, each of the saturated queues being initially determined to have a shared bandwidth rate that exceeds the maximum rate that is assigned thereto; and
calculating a clock mapping ratio ratio(t) for mapping a system real clock to the system virtual clock, the clock mapping ratio being equal to the total reserved weight of the backlogged ones of the output buffer queues when the total reserved weight of the backlogged ones of the output buffer queues is equal to the total reserved weight of the saturated queues, and being a function of the total reserved weight of the backlogged ones of the output buffer queues, the total reserved weight of the saturated queues, and the total bandwidth shared by the non-saturated backlogged ones of the output buffer queues after receiving excess bandwidth from the saturated queues when otherwise.

6. The method as claimed in claim 5, wherein, in step c), each of the incoming packets is assigned with a virtual arrival time with reference to the system virtual clock, the virtual starring time being the larger between the virtual arrival time and the virtual finishing time of a preceding packet at the head of the associated one of the output buffer queues.

7. The method as claimed in claim 6, wherein: if the associated one of the output buffer queues is one of the non-saturated backlogged ones of the output buffer queues, the virtual finishing time is equal to the sum of the virtual starring time and the quotient of the length of the packet divided by the product of the reserved weight of the associated one of the output buffer queues and the capacity of the output link; and
if the associated one of the output buffer queues is one of the saturated backlogged ones of the output buffer queues, the virtual finishing time is equal to the sum of the virtual starting time and the quotient of the length of the packet divided by the product of the assigned maximum rate of the associated one of the output buffer queues and the clock mapping ratio.

8. The method as claimed in claim 7, wherein the system virtual clock is updated at a rate of 1/ratio(t).

9. A multi-queue packet scheduling system far managing network packet traffic with minimum performance guarantees and maximum service rate control, comprising:
a plurality of output buffer queues, each of which is assigned with a reserved weight in bandwidth sharing of an output link and each of which is associated with a respective service class, at least one of the output buffer queues being optionally assigned with a maximum rate to constrain packet transmission through said at least one of the output buffer queues, the output buffer queues being adapted for enqueuing incoming packets therein according to associated service classes of the incoming packets;
a shared bandwidth rate calculator for determining in real-time shared bandwidth rates of maximum-rate constrained backlogged ones of the output buffer queues with reference to the reserved weights of the backlogged ones of the Output buffer queues and such that the shared bandwidth rate of each maximum-rate constrained backlogged one of the output buffer queues does not exceed the maximum rate which is assigned thereto; and
a packet scheduler associated operably with the shared bandwidth rate calculator and the output buffer queues for transmitting outgoing packets from the backlogged ones of the output buffer queues in accordance with a schedule that is based on the shared bandwidth rates determined by the shared bandwidth rate calculator;
wherein each of the output buffer Queues is a first-in, first-out buffer queue, said packet scheduling system further comprising a virtual time calculator associated operably with the shared bandwidth rate calculator for calculating virtual starting and virtual finishing times for the packet at the head of each of the backlogged ones of the output buffer queues to determine when the packet should start and finish servicing, the virtual starting and virtual finishing times being calculated with reference to the reserved weights of the output buffer queues and the shared bandwidth rates determined by the shared bandwidth rate calculator.

10. The multi-queue packet scheduling system as claimed in claim 9, further comprising a system virtual clock, the packet scheduler being operably associated wit the virtual time calculator and the system virtual clock, and selecting the packet at the head of one of the backlogged ones of the output buffer queues having the virtual starting time thereof less than the system virtual clock and further having the smallest virtual finishing time for transmission.

11. The multi-queue packet scheduling system as claimed in claim 10, further comprising a tinier, the packet scheduler being operably associated with the timer and, when the virtual starting time of the packet at the head of each of the backlogged ones of the output buffer queues is not less than the system virtual clock, selecting the packet at the head of one of the backlogged ones of the output buffer queues having the smallest virtual starting time, determining an idle period for the selected packet, setting the timer for the idle period, and transmitting the selected packet when the timer expires.

12. The multi-queue packet scheduling system as claimed in claim 11, wherein the packet scheduler cancels the timer upon detection of a change in status of one of the output buffer queues from unbacklogged to backlogged.

13. The multi-queue packet scheduling system as claimed in claim 10, wherein the shared bandwidth rate calculator determines a set of saturated queues from the backlogged ones of the output buffer queues, each of the saturated queues being initially determined to have a shared bandwidth raze that exceeds the maximum rate that is assigned thereto, the virtual time calculator further calculating a clock mapping ratio ratio(t) for mapping of a system real clock to the system virtual clock, the clock mapping ratio being equal to the total reserved weight of the backlogged ones of the output buffer queues when the total reserved weight of the backlogged ones of the output buffer queues is equal to the total reserved weight of the saturated queues, and being a function of the total reserved weight of the backlogged ones of the output buffer queues, the total reserved weight of the saturated queues, and the total bandwidth shared by the non-saturated backlogged ones of the output buffer queues after receiving excess bandwidth from the saturated queues when otherwise.

14. The multi-queue packet scheduling system as claimed in claim 13, wherein each of the incoming packets is assigned with a virtual arrival time with reference to the system virtual clock, the virtual time calculator determining the virtual starting time to he the larger between the virtual arrival time and the virtual finishing time of a preceding packet at the head of the associated one of the output buffer queues.

15. The multi-queue packet scheduling system as claimed in claim 14, wherein:

if the associated one of the output buffer queues is one of the non-saturated backlogged ones of the output buffer queues, the virtual time calculator determines the virtual finishing time to be equal to the sum of the virtual starting time and the quotient of the length of the packet divided by the product of the reserved weight of the associated one of the output buffer queues and the capacity of the output link; and if the associated one of the output buffer queues is one of the saturated backlogged ones of the output buffer queues, the virtual time calculator determines the virtual finishing time to be equal to the sum of the virtual starting time and the quotient of the length of the packet divided by the product of the assigned maximum rate of the associated one of the output buffer queues and the clock mapping ratio.

16. The multi-queue packet scheduling system as claimed in claim 15, wherein the system virtual clock is updated at a rate of 1/ratio (t).

* * * * *